US009499960B2

(12) United States Patent
Zhu et al.

(10) Patent No.: US 9,499,960 B2
(45) Date of Patent: Nov. 22, 2016

(54) FLUID DELIVERY SYSTEM FOR USE WITH WATER DISCHARGE FIXTURE

(71) Applicant: Xiamen Lota International Co., Ltd., Xiamen (CN)

(72) Inventors: Chuanbao Zhu, Xiamen (CN); Liming Ye, Xiamen (CN); Jianping Zhou, Xiamen (CN)

(73) Assignee: Xiamen Lota International Co., Ltd., Xiamen (CN)

( * ) Notice: Subject to any disclaimer, the term of this patent is extended or adjusted under 35 U.S.C. 154(b) by 543 days.

(21) Appl. No.: 13/740,952

(22) Filed: Jan. 14, 2013

(65) Prior Publication Data

US 2013/0192686 A1 Aug. 1, 2013

Related U.S. Application Data

(60) Provisional application No. 61/589,096, filed on Jan. 20, 2012.

(51) Int. Cl.
*E03C 1/06* (2006.01)
*F16L 3/00* (2006.01)
*E03C 1/04* (2006.01)

(52) U.S. Cl.
CPC ............ *E03C 1/0403* (2013.01); *E03C 1/06* (2013.01); *F16L 3/00* (2013.01); *E03C 1/0401* (2013.01); *Y10T 137/0402* (2015.04); *Y10T 137/598* (2015.04)

(58) Field of Classification Search
CPC ........... E03C 1/06; E03C 1/0403; F16L 3/00

USPC .......................... 137/315.12, 801; 4/675–678
See application file for complete search history.

(56) References Cited

U.S. PATENT DOCUMENTS

| | | |
|---|---|---|
| 3,854,493 A | 12/1974 | Farrell |
| 3,911,946 A | 10/1975 | Humpert et al. |
| 4,103,709 A | 8/1978 | Fischer |
| 4,262,699 A | 4/1981 | Fabian |
| 4,667,987 A | 5/1987 | Knebel |
| 5,010,922 A | 4/1991 | Agresta |
| 5,348,048 A | 9/1994 | Schirado et al. |
| 5,797,151 A | 8/1998 | Ko |
| 5,931,200 A | 8/1999 | Mulvey et al. |
| 5,937,892 A | 8/1999 | Meisner et al. |
| 5,983,923 A | 11/1999 | Hobbs et al. |
| 6,073,972 A | 6/2000 | Rivera |
| 6,085,784 A | 7/2000 | Bloom et al. |

(Continued)

FOREIGN PATENT DOCUMENTS

| | | |
|---|---|---|
| CA | 2752177 A1 | 9/2010 |
| CN | 102333965 A | 1/2012 |

(Continued)

*Primary Examiner* — Kevin Lee
(74) *Attorney, Agent, or Firm* — McDermott Will & Emery LLP

(57) ABSTRACT

The invention provides a fluid delivery assembly for use with a water discharge fixture, such as a faucet. The fluid delivery assembly includes a tube assembly, a housing and a retaining assembly. The fluid delivery assembly provides for water flow from hot and cold water inlets to the faucet. The fluid delivery assembly may be assembled by hand without the need for tools, allowing for easy replacement of the fluid delivery assembly without the need to disassemble the faucet assembly, or to replace the entire faucet assembly.

7 Claims, 21 Drawing Sheets

(56) References Cited

U.S. PATENT DOCUMENTS

| | | |
|---|---|---|
| 6,106,027 A | 8/2000 | Mulvey et al. |
| 6,123,106 A | 9/2000 | Benstead |
| 6,170,515 B1 | 1/2001 | Peterson et al. |
| 6,195,818 B1 | 3/2001 | Rodstein et al. |
| 6,328,067 B1 | 12/2001 | Hsiung |
| 6,360,770 B1 | 3/2002 | Buchner et al. |
| 6,405,749 B1 | 6/2002 | Bloom et al. |
| 6,434,765 B1 | 8/2002 | Burns et al. |
| 6,641,177 B1 | 11/2003 | Pinciaro |
| 6,684,906 B2 | 2/2004 | Burns et al. |
| 6,725,472 B2 | 4/2004 | Gray et al. |
| 6,820,291 B1 | 11/2004 | Weaver |
| 6,912,742 B1 | 7/2005 | Wang |
| 7,032,260 B2 | 4/2006 | Hwang |
| 7,039,966 B1 | 5/2006 | Cranston, Jr. |
| 7,043,777 B2 | 5/2006 | Bloom et al. |
| 7,055,545 B2 | 6/2006 | Mascari et al. |
| 7,077,153 B2 | 7/2006 | Segien, Jr. |
| 7,162,755 B2 | 1/2007 | Mintz et al. |
| 7,207,075 B2 | 4/2007 | Peterson et al. |
| 7,210,493 B1 | 5/2007 | Wang |
| 7,231,936 B2 | 6/2007 | Chang |
| 7,269,864 B2 | 9/2007 | Brown et al. |
| 7,313,834 B2 | 1/2008 | Tan et al. |
| 7,373,674 B1 | 5/2008 | Condon |
| 7,387,137 B2 | 6/2008 | Chung |
| 7,404,413 B2 | 7/2008 | Chang |
| 7,406,980 B2 | 8/2008 | Pinette |
| 7,415,991 B2 | 8/2008 | Meehan et al. |
| 7,578,309 B2 | 8/2009 | Breda |
| 7,698,755 B2 | 4/2010 | McNerney et al. |
| 7,766,043 B2 | 8/2010 | Thomas et al. |
| 7,814,927 B2 | 10/2010 | Hansen |
| 7,819,137 B2 | 10/2010 | Nelson et al. |
| 7,896,025 B2 | 3/2011 | Hanson |
| 7,971,742 B2 | 7/2011 | Kreider |
| 7,979,929 B2 | 7/2011 | Vogel et al. |
| 8,011,384 B2 | 9/2011 | Izzy et al. |
| 8,061,386 B2 | 11/2011 | Mueller et al. |
| 8,695,625 B2 * | 4/2014 | Marty et al. ............ 137/315.12 |
| 2004/0143900 A1 | 7/2004 | Nelson et al. |
| 2005/0063772 A1 | 3/2005 | Bladen |
| 2005/0098221 A1 | 5/2005 | Mascari et al. |
| 2005/0138725 A1 | 6/2005 | Hwang |
| 2006/0101576 A1 | 5/2006 | Rhodes |
| 2006/0117477 A1 | 6/2006 | Rosko |
| 2008/0178957 A1 | 7/2008 | Thomas et al. |
| 2008/0196776 A1 | 8/2008 | Ko |
| 2008/0277611 A1 | 11/2008 | Esche et al. |
| 2009/0000026 A1 | 1/2009 | Hanson |
| 2009/0001310 A1 | 1/2009 | Hanson |
| 2009/0032170 A1 | 2/2009 | Williams |
| 2010/0125946 A1 | 5/2010 | Meisner et al. |
| 2010/0155505 A1 | 6/2010 | Lopp et al. |
| 2010/0170578 A1 | 7/2010 | Liu et al. |
| 2010/0200613 A1 | 8/2010 | Smith et al. |
| 2011/0115219 A1 | 5/2011 | Biris et al. |
| 2011/0297248 A1 | 12/2011 | Nelson et al. |
| 2013/0043419 A1 * | 2/2013 | Ritter et al. .......... E03C 1/0403 251/151 |

FOREIGN PATENT DOCUMENTS

| | | |
|---|---|---|
| EP | 2401513 A1 | 1/2012 |
| MX | 2011008426 A | 9/2011 |
| WO | WO-2008086379 A1 | 7/2008 |
| WO | WO-2010099397 A1 | 9/2010 |
| WO | WO-2011155904 A1 | 12/2011 |
| WO | WO 2014/017898 * | 1/2014 .................... 137/801 |

\* cited by examiner

FLUID DELIVERY SYSTEM FOR USE WITH WATER DISCHARGE FIXTURE

RELATED APPLICATION

The present Application for Patent claims priority under 35 U.S.C. §119 to Provisional Application No. 61/589,096 entitled "FLUID DELIVERY ASSEMBLY" filed Jan. 20, 2012 ("the Provisional Application"). The Provisional Application is assigned to the assignee of the present application, and is hereby expressly incorporated by reference.

TECHNICAL FIELD

The invention relates to a fluid delivery assembly that is installed in a water discharging fixture, such as a faucet. The fluid delivery assembly includes a tube assembly defining a fluid flow path, a housing, and a retaining assembly that enables the fluid delivery assembly to be easily removed or replaced.

BACKGROUND OF THE INVENTION

Fluid delivery assemblies are known, and can be found in both residential and commercial settings. In either setting, the fluid delivery assembly provides fluid flow from hot and cold water sources. The fluid is dispensed through a discharge fixture, such as a kitchen or lavatory faucet. While such fluid delivery assemblies provide some benefits, they nevertheless have certain limitations. For example, the water delivery lines attached between the water source lines and the faucet typically require tools for installation of the faucet assembly. Also, conventional fluid delivery assemblies typically have inlet lines molded together or pre-formed with a cartridge housing, such that replacing the inlet lines requires replacing the entire faucet assembly. Examples of fluid delivery assemblies having these and other limitations are found in U.S. Pat. No. 7,032,260 to Hwang and U.S. Pat. No. 6,123,106 to Benstead.

The present invention is intended to solve the limitations of conventional fluid delivery assemblies discussed above and other problems, and to provide advantages and aspects not provided by prior fluid delivery assemblies. Some of the features and advantages of the present invention are described in the following detailed description and the accompanying drawings.

SUMMARY OF THE INVENTION

The present invention is directed to a fluid delivery assembly that includes a number of components that interact to define a replaceable fluid flow path from a fluid source (such as a hot and cold water source) to a fluid discharge assembly (such as a faucet). These interacting components may include a tube assembly (e.g., a plastic tube assembly), a housing (e.g., a cartridge housing), and a retaining assembly (e.g., a threaded mounting shank and a cooperatively threaded housing). These components enable the fluid delivery assembly to be easily attached to or detached from a faucet assembly by hand, that is, without the use of tools. These components may be separate and distinct such that an individual component may be removed and/or replaced.

An important feature of the invention is that its fluid delivery assembly is mounted completely below its related countertop or deck. It follows that the installation or removal of the fluid delivery assembly occurs completely below the countertop or deck. This permits such installation or removal of the fluid delivery assembly without removing or replacing portions of the faucet assembly above the deck.

According to one aspect of the invention, the fluid delivery assembly includes a tube assembly, a housing and a retaining assembly. The tube assembly includes a tube defining a fluid pathway. The tube is configured at one end to connect with a fluid source, such as an angle valve of a hot or cold water supply line. The other end of the tube is configured to connect with the housing. The housing is sized and shaped to receive at least one tube assembly. For example, the housing may include two end bodies. The first end body is connected to a first tube assembly, and the second end body connected to a second tube assembly. One tube assembly provides hot water to the housing and the faucet from the hot water source. The other tube assembly provides cold water to the housing and the faucet from the cold water source.

The retaining assembly includes a securing member that has a threaded portion. The securing member is movable up and down a portion of the length of the tube, and rotationally around the circumference of the tube. The retaining assembly also includes a mounting member that is a threaded portion on the end body. When the securing member is rotated by hand, the threaded portions of the securing member and the mounting member cooperatively engage with each other to secure the tube assembly to the housing. The securing member and the mounting member include sufficient threading to ensure a precise and well-sealed connection between the tube assembly and the end body. Preferably, the securing member is externally threaded and the end body is internally threaded. Alternatively, the securing member may be internally threaded and the end body may be externally threaded. The housing also has a center body, which may receive a cartridge housing. Alternatively, the center body may be a cartridge housing. The housing and the mounting member are one component, while the tube assembly that includes the securing member are another component. As a result, either component may be removed and/or replaced, while leaving the other component installed within the faucet assembly.

The retaining assembly includes a securing member that has a threaded portion. The securing member is movable up and down a portion of the length of the tube assembly, and is also rotationally movable around the circumference of the tube assembly. The retaining assembly also includes a mounting member that has a threaded portion. As the securing member is rotated by hand, the threaded portions of the securing member and the mounting member cooperatively engage with each other to secure the tube assembly to the housing. The securing member and the mounting member include sufficient threading to ensure a precise and well-sealed connection between the tube assembly and the end body. Preferably, the securing member is externally threaded and the end body is internally threaded. Alternatively, the securing member may be internally threaded and the end body may be externally threaded. The housing and the tube assembly are separate components that are not integrally formed together, such as by over-molding or adhesively bonding. Therefore, any component may be removed and/or replaced while keeping the other components as part of the faucet assembly.

Other features and advantages of an aspect of the invention will be apparent from the following specification, taken in conjunction with the following drawings.

BRIEF DESCRIPTION OF THE DRAWINGS

To understand the present invention, it will now be described by way of example, with reference to the accompanying drawings in which.

DETAILED DESCRIPTION

This invention may take many different forms. The current description and drawings teach only a few of the many different forms or embodiments of the invention. It should be understood that the present disclosure is to be considered as disclosing only a few, non-limiting examples of the principles of the invention. This disclosure is not intended to limit the broadest aspects of the invention to the illustrated embodiments.

Figure 1:
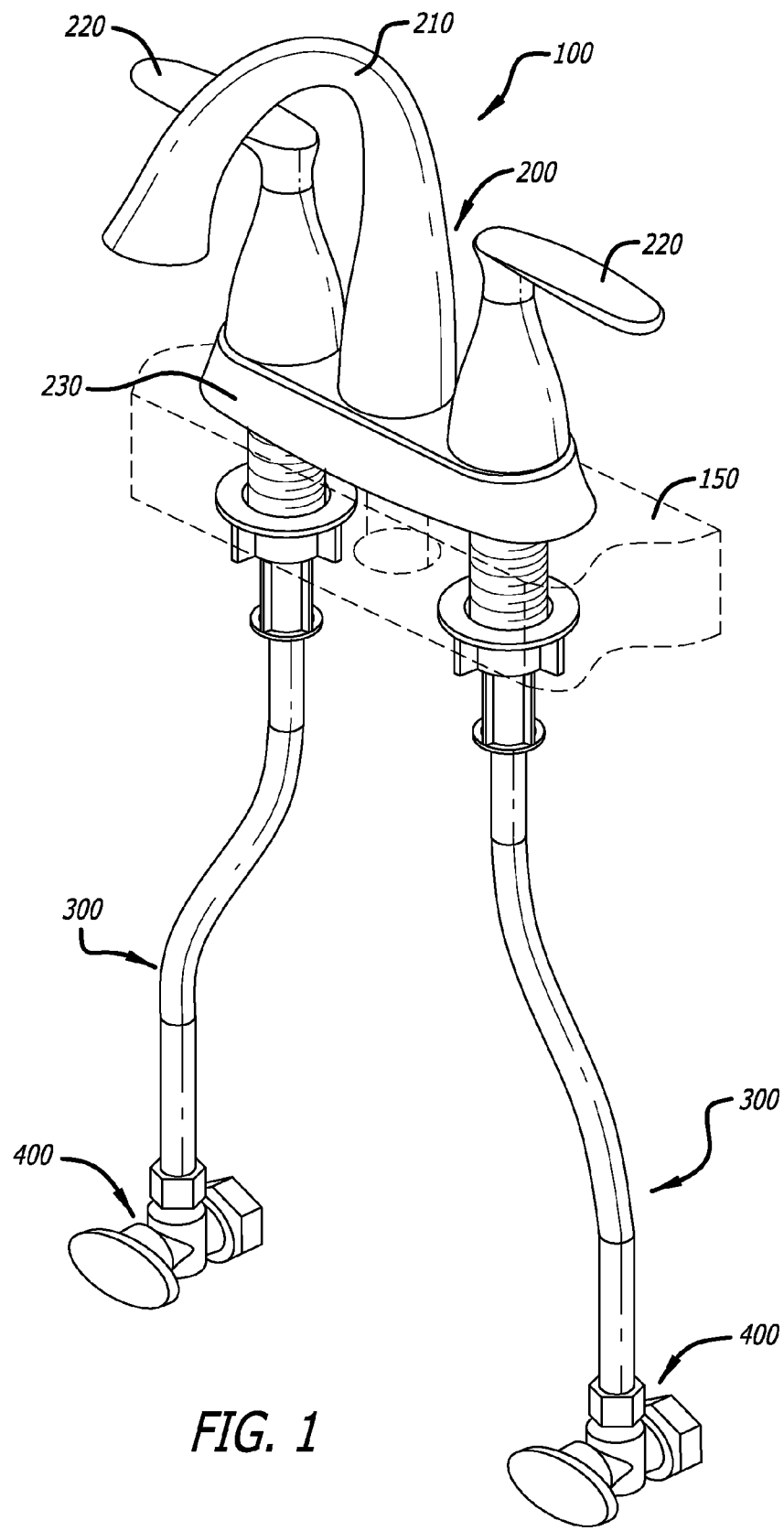
FIG. 1 is a perspective view of the invention, connected to a faucet, to form an assembly.

FIG. 1 illustrates a faucet system 100 for delivery of water to a user. The faucet system 100 includes a faucet assembly 200, a fluid delivery assembly 300 and fluid inlet valves 400. The faucet assembly 200 includes a delivery spout 210, two handles 220 and an escutcheon 230 that are mounted as an assembly on top of a countertop 150 (shown in broken line form). The fluid delivery assembly 300 is connected between the faucet assembly 200 and the fluid inlet valves 400. One inlet valve 400 may provide hot water from a hot water source (e.g., water heater) and the other inlet valve 400 may provide cold water from a cold water source (e.g., well or city water). Alternatively, faucet system 100 may be any other suitable fluid delivery system (e.g., a shower system).

Figure 2:
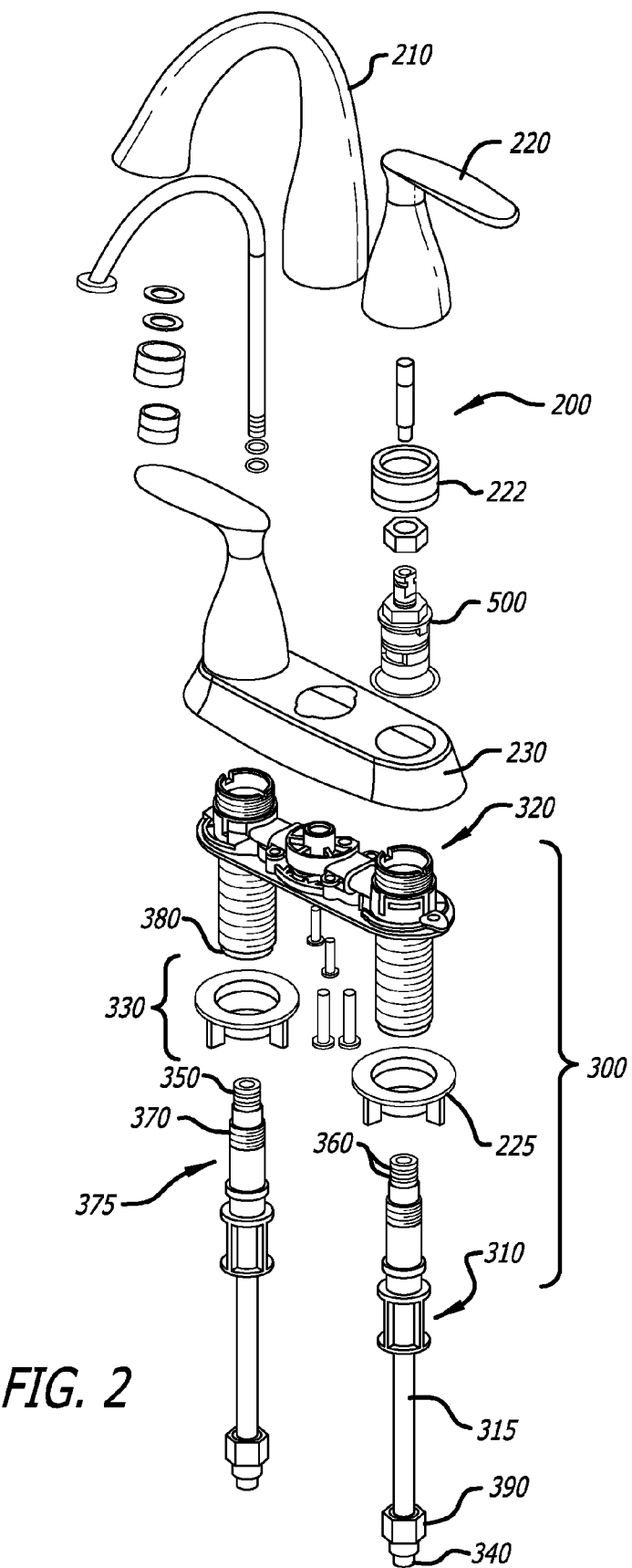
FIG. 2 is an exploded perspective view of the assembly of FIG. 1, with two fluid delivery assemblies shown positioned for assembly with the faucet.

FIG. 2 illustrates an exploded view of the faucet assembly 200 and the fluid delivery assembly 300. As explained in greater detail below, the fluid delivery assembly 300 includes at least one tube assembly 310 defining a flow path for hot or cold water, a housing 320 and a retaining assembly 330. The tube assembly 310 has a first portion 340 configured to be connected to a fluid source, such as a hot or cold water inlet line. The first portion 340 may be connected to the fluid source inlet line by a connection member 390, such as a threaded pressure fitting nut. The tube assembly 310 may preferably be comprised of PERT plastic tubing, and the housing 320 may be comprised of plastic.

As may also be seen in FIG. 2, a second portion 350 of the tube assembly 310 is configured to connect with the housing 320. This second portion 350 is sized and shaped to fit tightly within the housing 320. The second portion 350 also includes sealing member 360, such as one or more O-rings, to seal the connection between the second portion 350 and the housing 320 and prevent fluid leakage through that connection. The retaining assembly 330 includes a securing member 375 having a tube threaded portion 370 and a housing threaded portion 380 (see FIG. 22). The securing member 375 is slidably movable along the length of a portion of a tube 315 and rotationally movable about the circumference of the tube 315.

The fluid delivery assembly 300 is assembled by sliding the tube assembly 310 into the housing 320, such that the second portion 350 fits into the housing 320. The securing member 375 is then rotated by hand so that the tube threaded portion 370 and the housing threaded portion 380 are threadably secured to each other. This in turn secures the tube assembly 310 to the housing 320.

At the other end of the fluid delivery assembly 300, the first portion 340 is connected to the fluid source inlet valve 400. A sealed connection is effected by tightening the connection member 390 to the inlet valve 400 with a wrench.

The fluid delivery assembly 300 may be connected to various types of faucets. For example, FIG. 1 illustrates connecting two tube assemblies 310 to a two handled lavatory sink fixture. Alternatively, the fluid delivery assembly 300 may be used in any other suitable faucet system, such as a single handled faucet fixture or a two handled kitchen sink fixture with a side sprayer.

Each faucet assembly 200 may have one or more fluid flow cartridge assemblies 500. For example, the faucet assembly 200 shown in FIG. 2 has two fluid flow cartridge assemblies 500, one for the hot water and one for the cold water. Each fluid flow cartridge 500 is configured to control the flow rate of a single fluid source, such as a range of fluid flow from no fluid flow at all (e.g., hot water off) to maximum fluid flow (e.g., hot water on all the way). Alternatively, a single fluid flow cartridge assembly may be configured to mix fluids from two fluid sources (e.g., hot and cold water), such as in a single handle faucet, for example.

Figure 3:
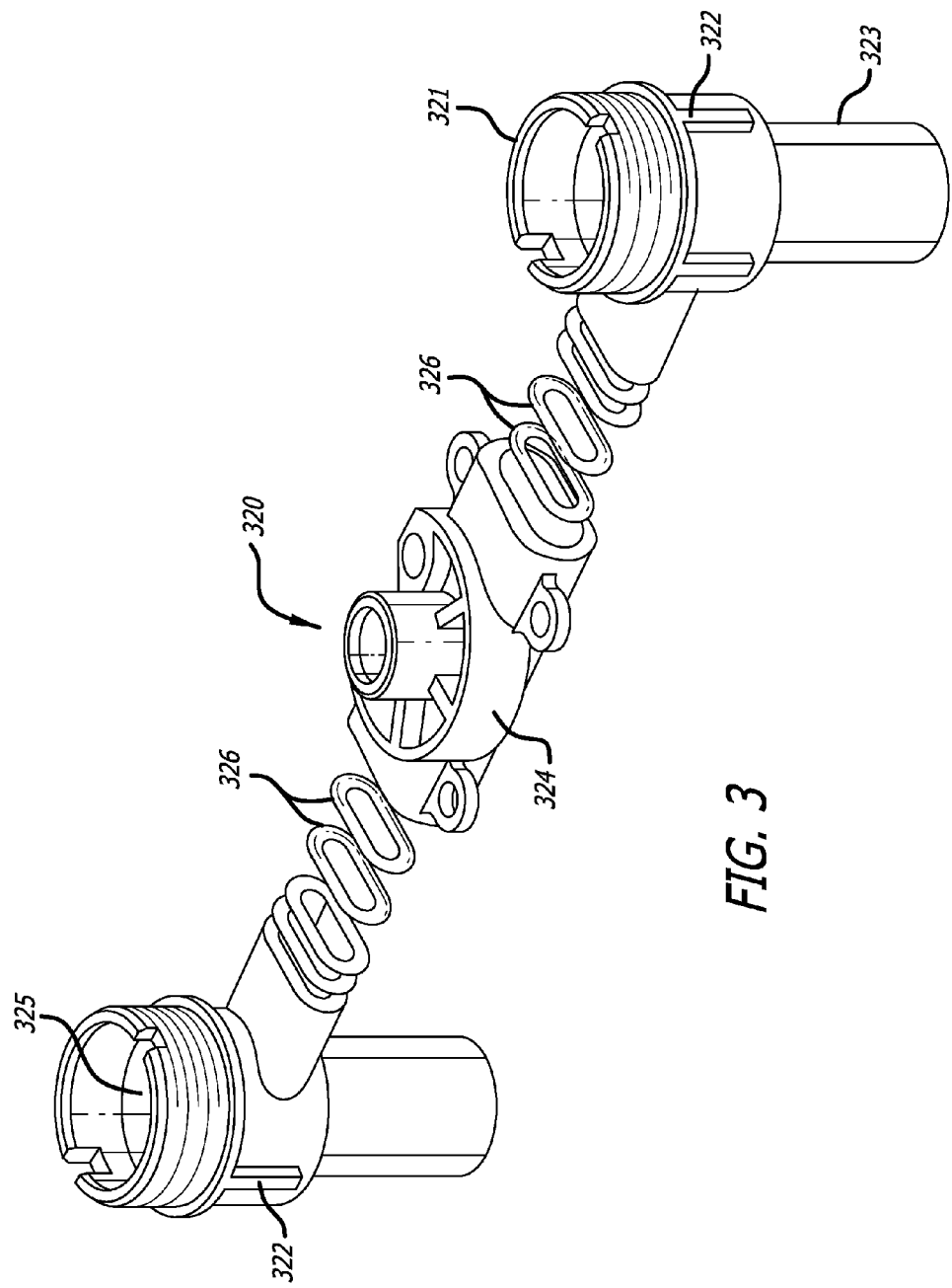
FIG. 3 is an exploded perspective view of an embodiment of a housing.
Figure 4:
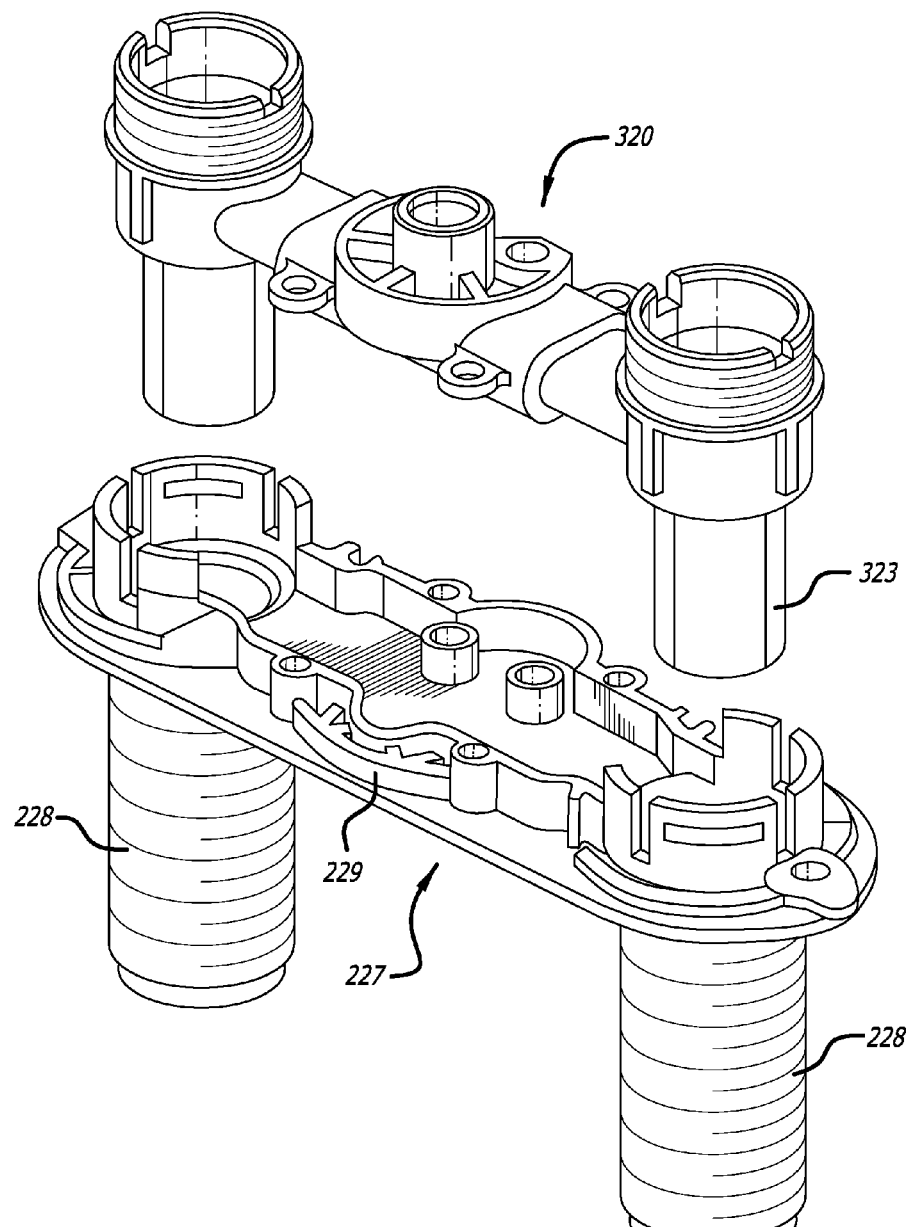
FIG. 4 is an exploded perspective view of the housing of FIG. 3 and an embodiment of a mounting base.
Figure 5:
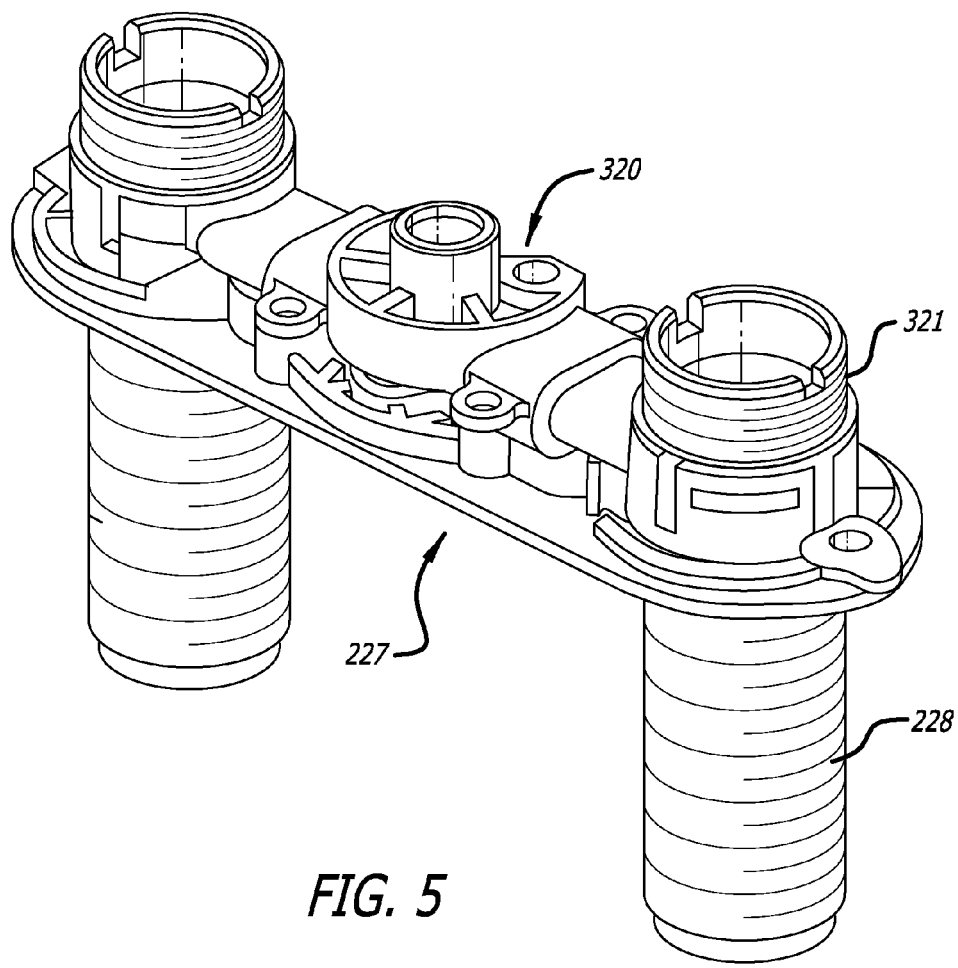
FIG. 5 is a perspective view of an assembly of the components of FIG. 4.

FIG. 3 illustrates housing 320, which includes a pair of end bodies (each designated as end body 322). These end bodies 322 are connected to the opposite ends of a center body 324. Center body 324 forms a waterway for supplying the hot and cold water from the tube assemblies 310 into a water discharge fixture, such as delivery spout 210 shown in FIG. 2. Each end body 322 includes sealing member 326, such as one or more 0-rings or gaskets, to seal the connection between the end body 322 and the center body 324 and prevent fluid leakage through that connection. The end body 322 includes a threaded cartridge sealing portion 321 that is threaded on the outside and that is configured to receive a cartridge sealing nut 222 as shown in FIG. 2. The cartridge sealing portion 321 also includes a cartridge housing 325 on the inside that is configured to receive a fluid flow cartridge assembly 500 (see FIG. 8). The end body 322 also includes a mounting base insert portion 323 that is configured to be slidably inserted into a portion of a mounting base 227. As shown in FIGS. 4 and 5, the housing 320 is seated in the mounting base 227. The mounting base 227 is attached to a countertop or deck, such as the countertop 150 shown in broken line form in FIG. 1. For example, the mounting base 227 has two threaded mounting spindles 228 connected to a center base 229. The threaded mounting spindles 228 may be inserted into holes in the countertop 150 such that the center base 229 rests flush against the top of the countertop 150. Mounting base securing nuts 225 (shown in FIG. 2) may then be threaded onto the threaded mounting spindles 228 from underneath the countertop 150 and tightened until the tops of the mounting base securing nuts 225 are flush against the bottom of the countertop 150, thereby securing the mounting base 227 to the countertop 150.

Figure 6:
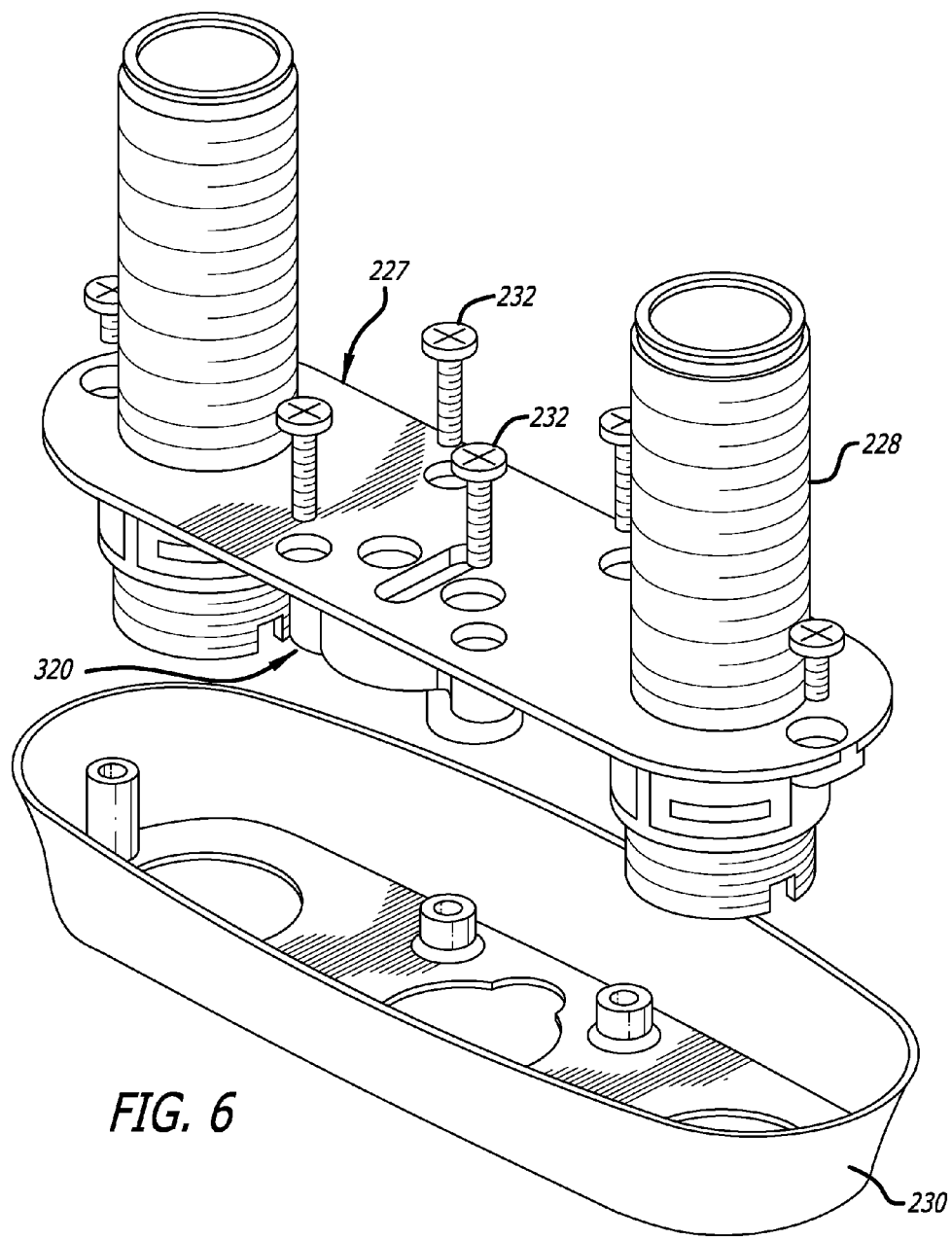
FIG. 6 is an exploded perspective view of the assembly of FIG. 5 and an embodiment of an escutcheon.
Figure 7:
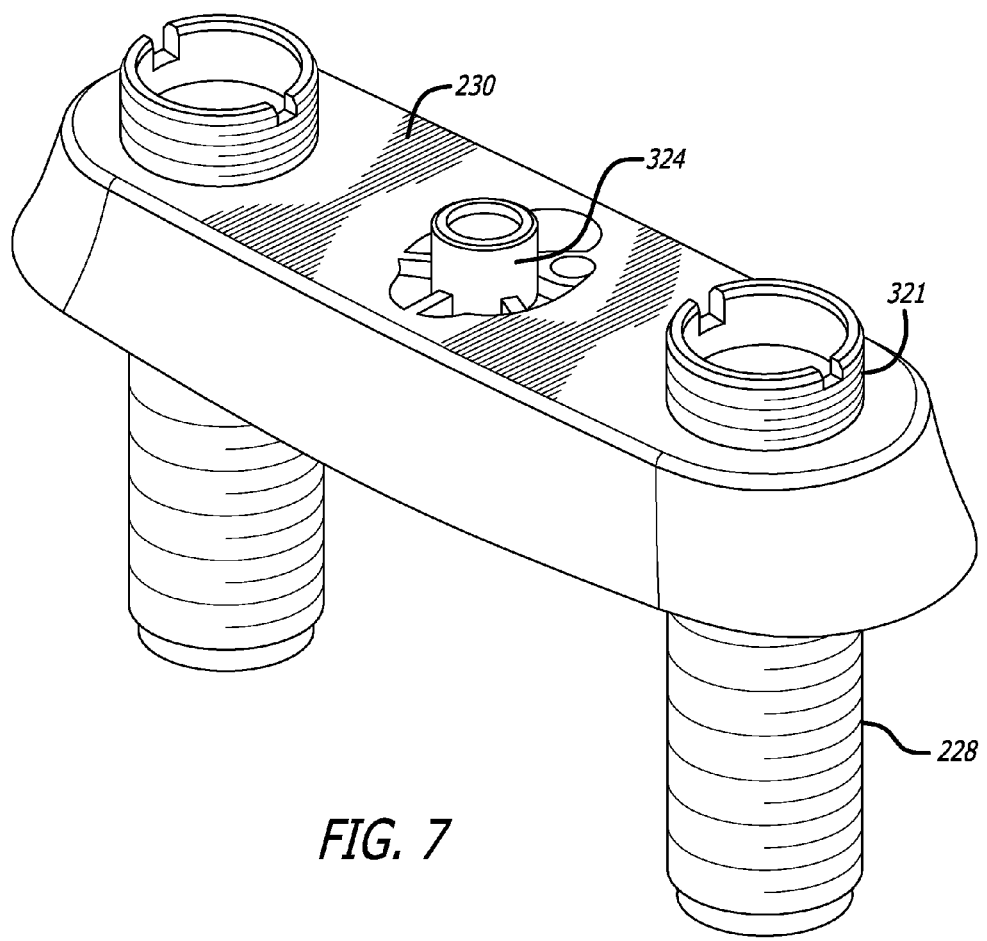
FIG. 7 is a perspective view of an assembly of the components of FIG. 6.

The threaded mounting spindles 228 are hollow and are configured to slidably receive the mounting base insert portions 323 of the housing 320. Portions of the end bodies 322 and the center body 324 are configured to fit within the center base 229. The assembled housing 320 and mounting base 227 may then be secured together to escutcheon 230 with securing members 232, such as screws (as shown in FIG. 6), thereby securing the escutcheon 230 onto the mounting base 227 on top of the countertop 150 as shown in FIGS. 1 and 7.

Figure 8:
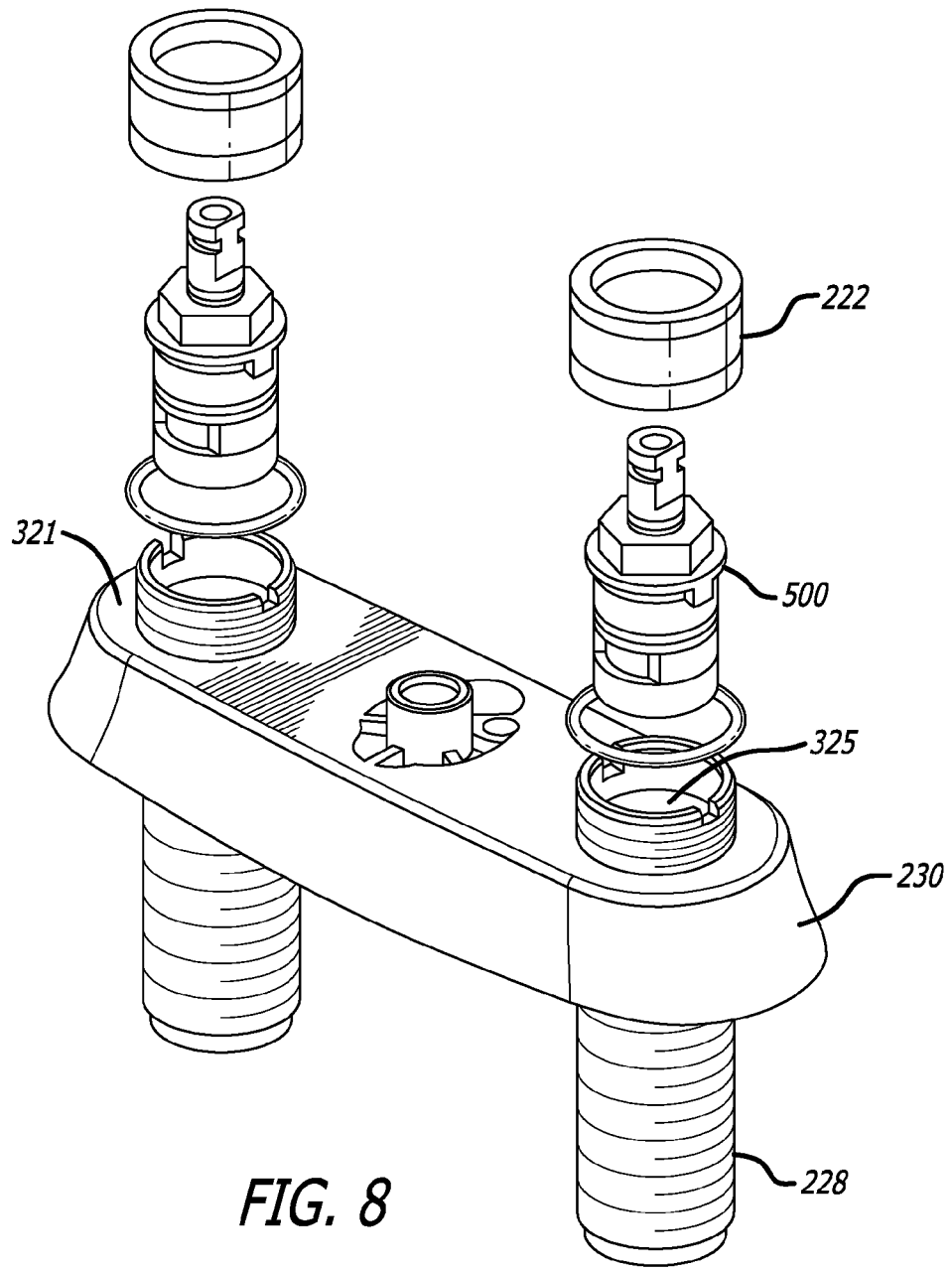
FIG. 8 is an exploded perspective view of the assembly of FIG. 7 and an embodiment of two fluid flow cartridge assemblies.
Figure 9:
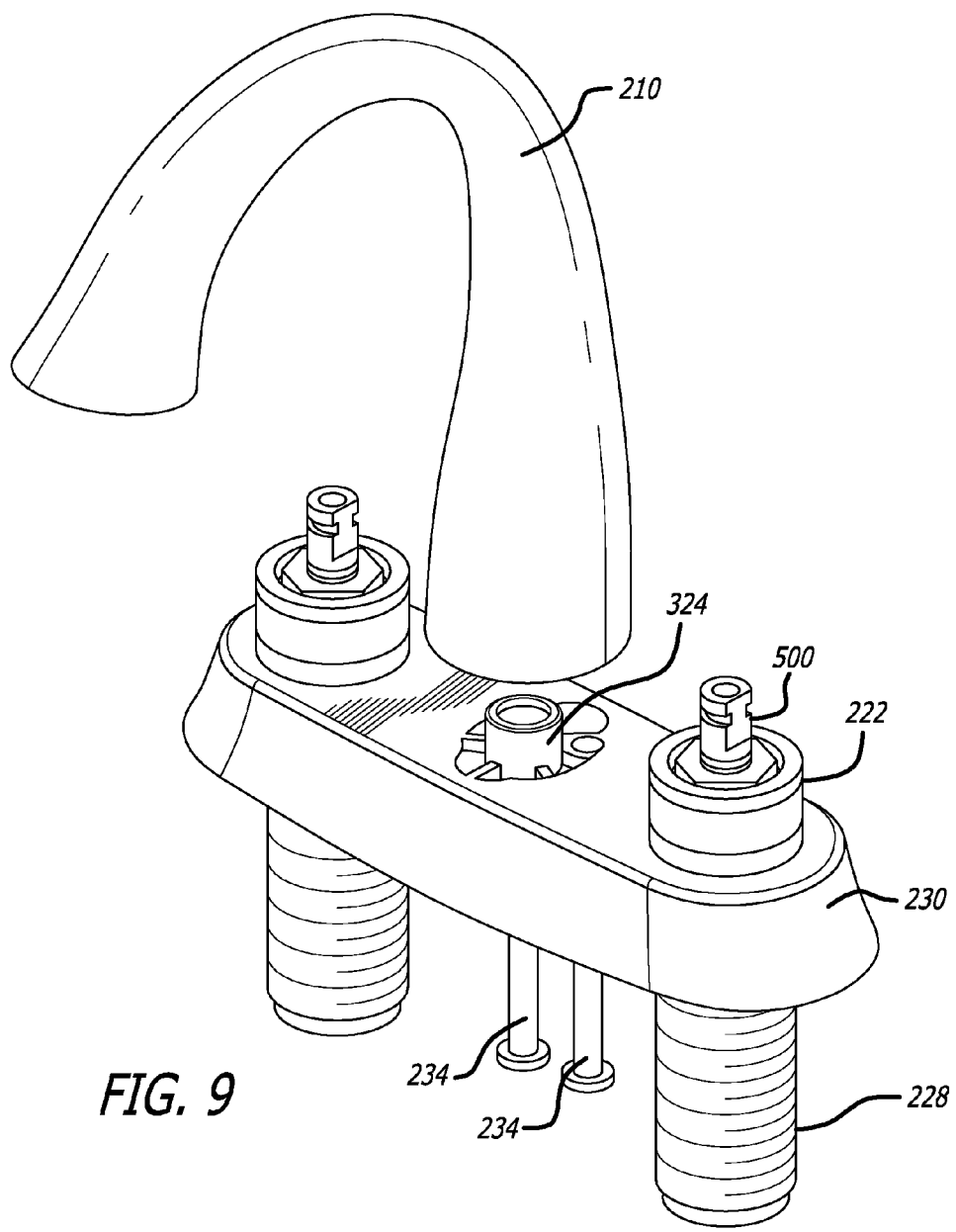
FIG. 9 is an exploded perspective view of an assembly of the components of FIG. 8 and an embodiment of a delivery spout.
Figure 10:
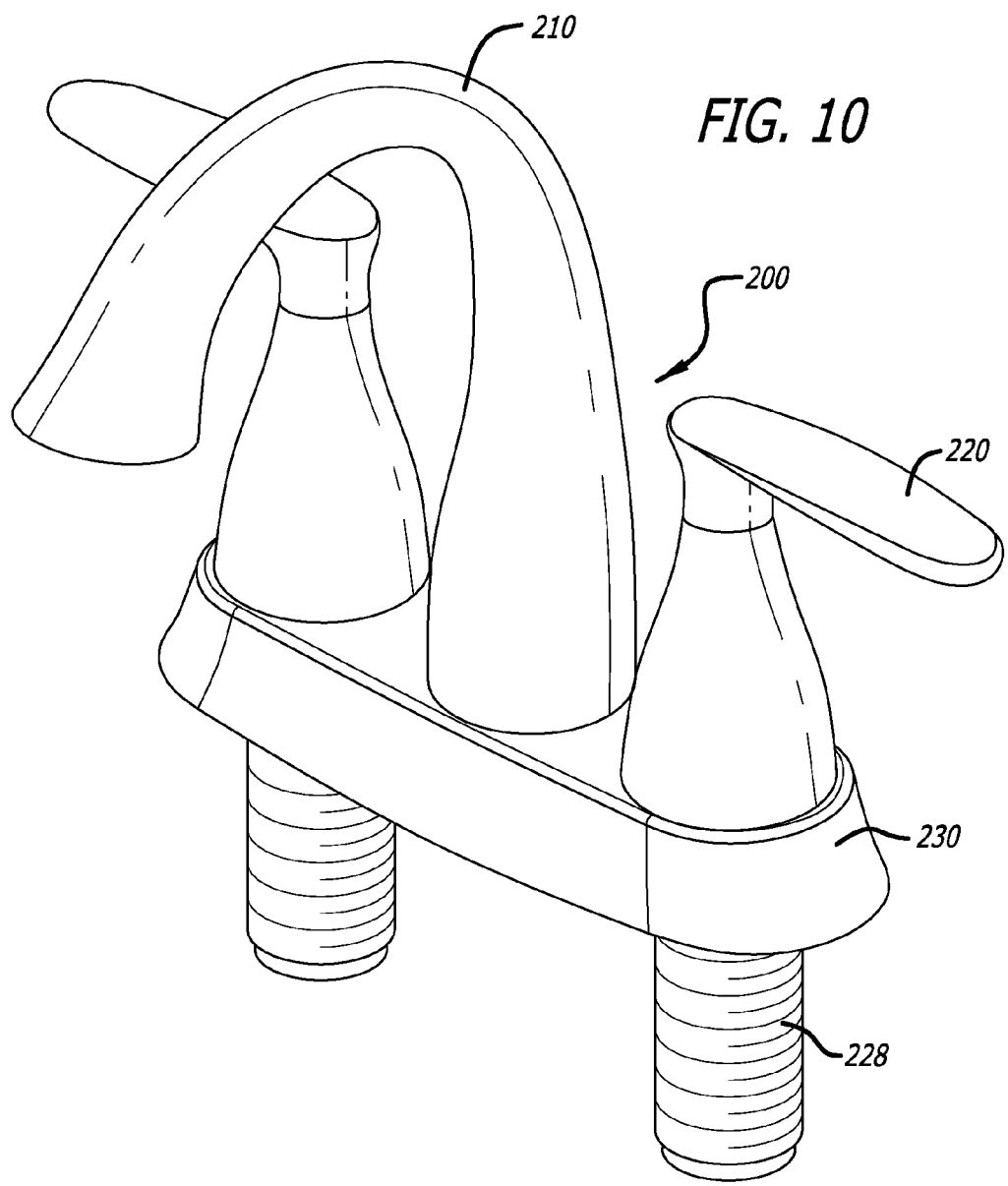
FIG. 10 is a perspective view of an assembly of the components of FIG. 9 and an embodiment of two handles.
Figure 11:
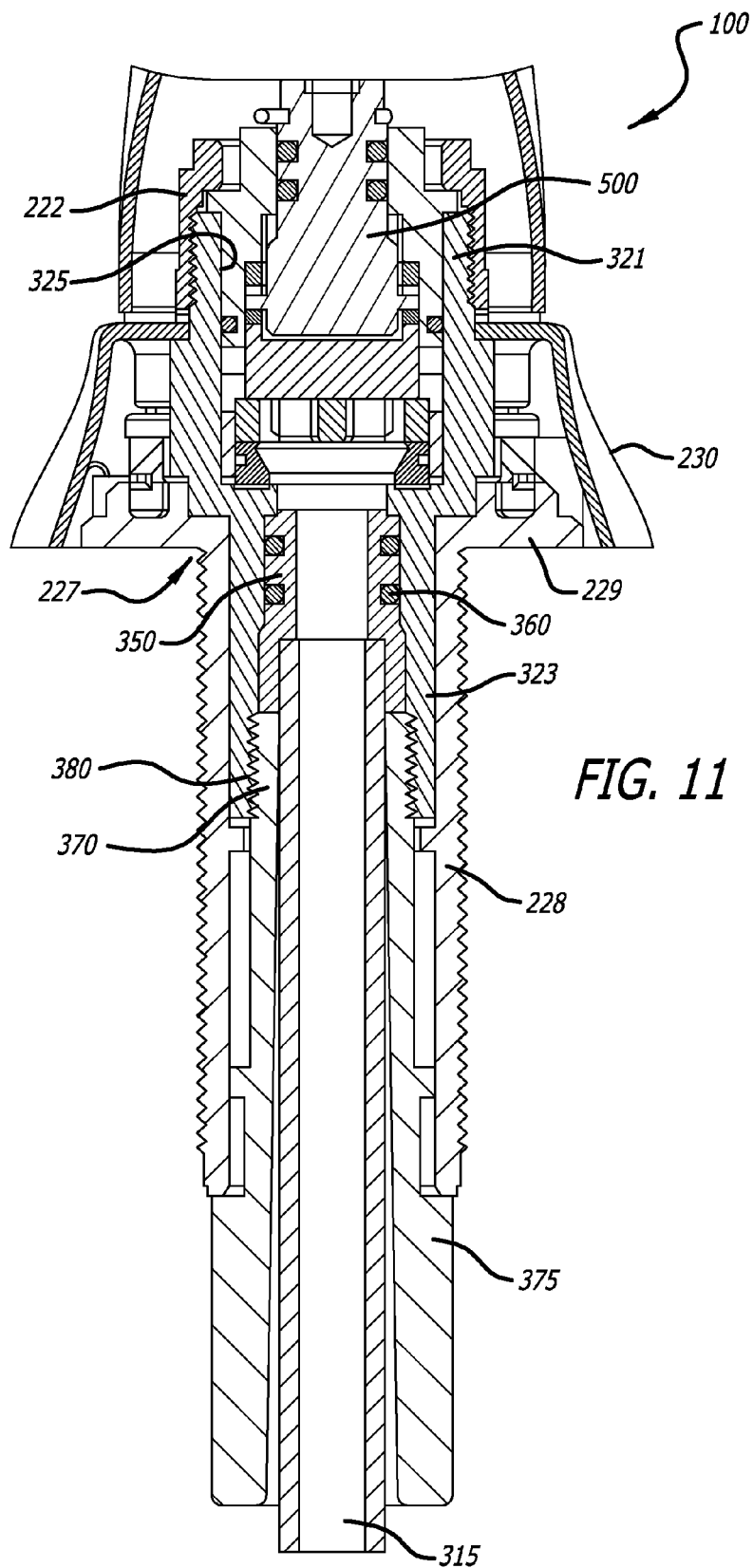
FIG. 11 is a cross-sectional side view of a portion of the faucet assembly of FIG. 1.

As illustrated in FIG. 8, fluid flow cartridges 500 may be inserted into the cartridge housing 325 of the housing 320 and secured with the cartridge sealing nut 222. The delivery spout 210 may be attached to the escutcheon 230 and the center body 324 using securing members 234, such as screws (see FIG. 9). Handles 220 may be attached to the fluid flow cartridges 500 and/or the cartridge sealing nut 222 to complete the faucet assembly 200 as shown in FIG. 10. FIG. 11 shows a cross-sectional view of the faucet system 100.

Figure 12:
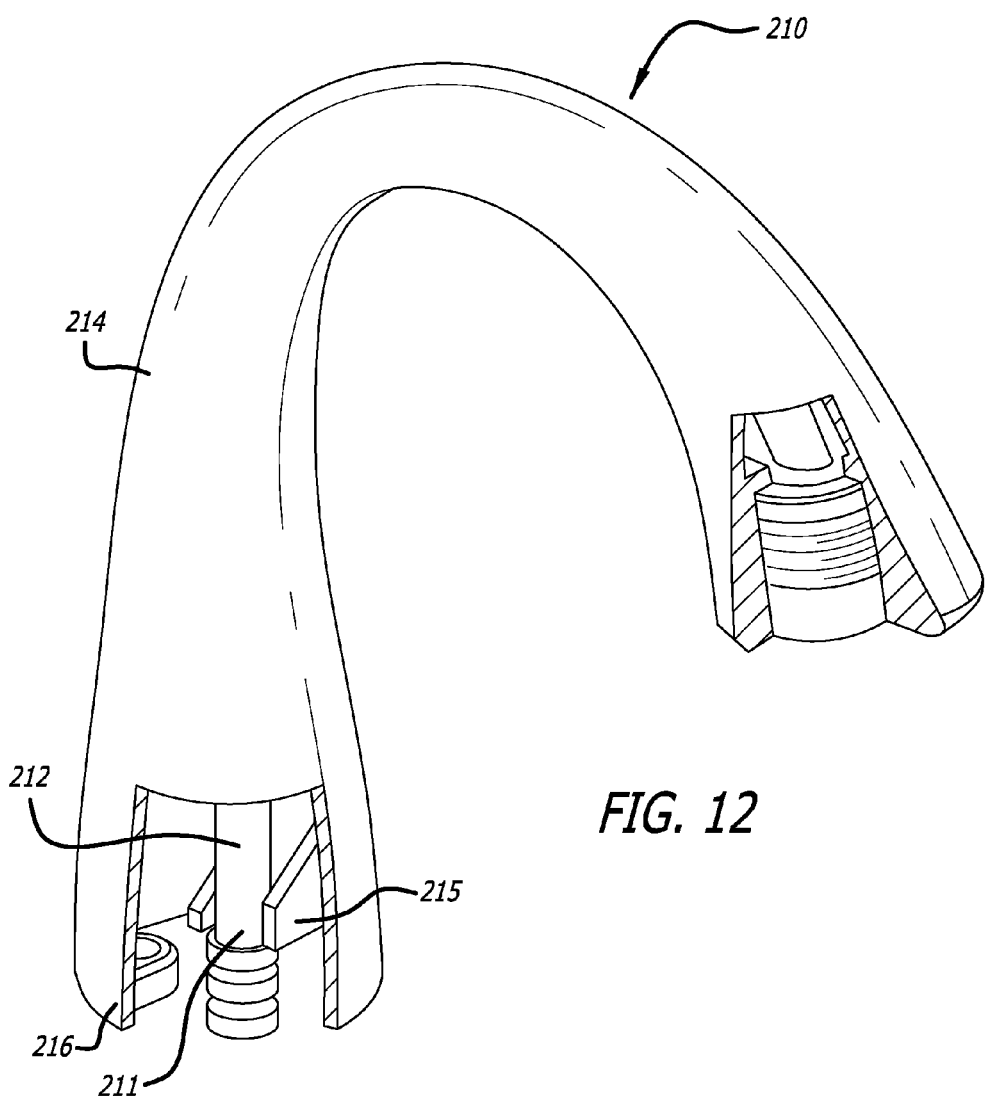
FIG. 12 is a partially cut-away perspective view of an embodiment of a delivery spout.
Figure 13:
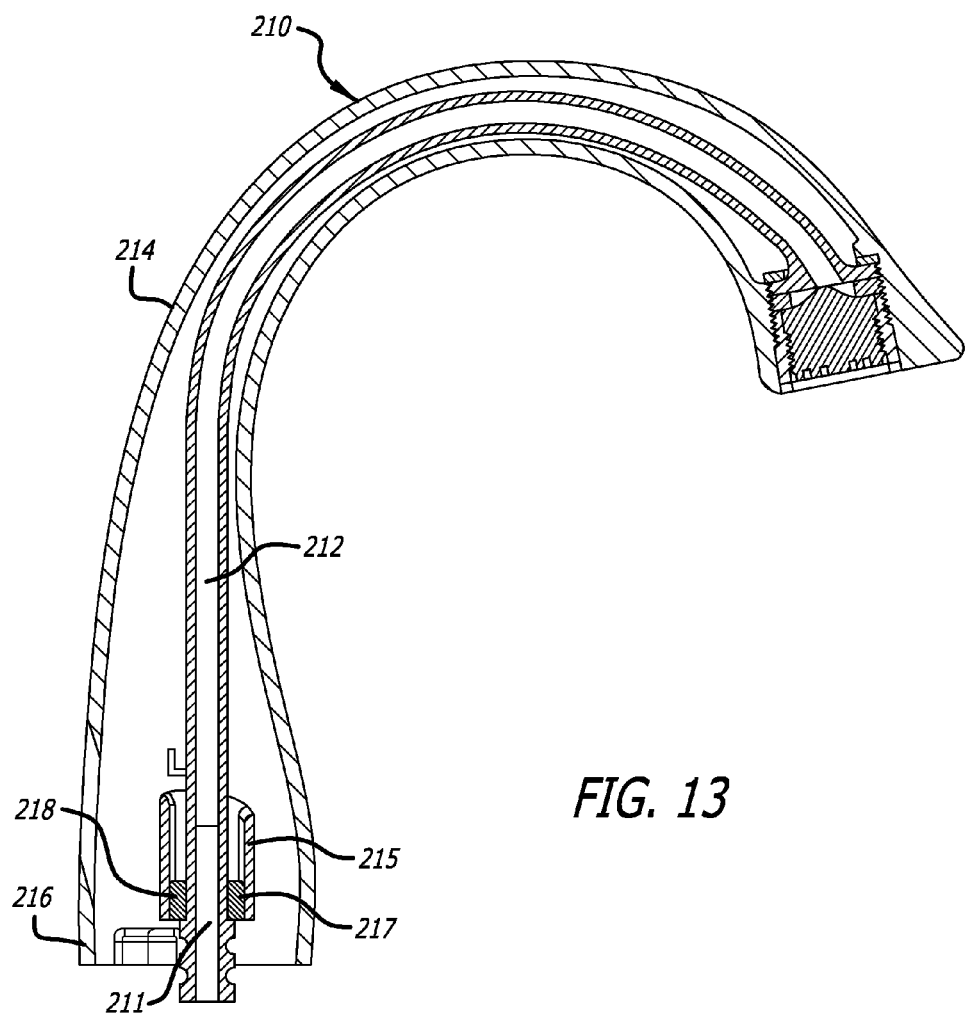
FIG. 13 is a cross-sectional side view of the delivery spout of FIG. 12.
Figure 14:
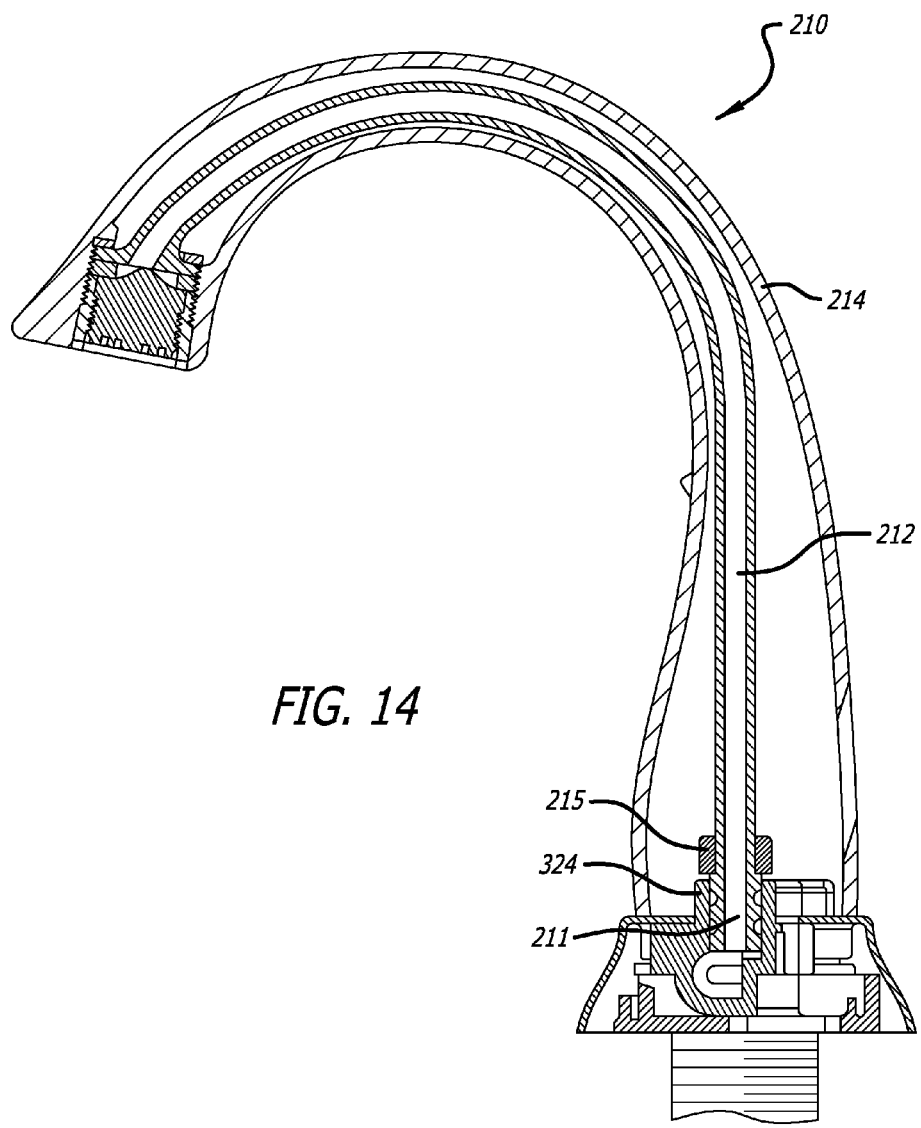
FIG. 14 is a cross-sectional side view of a portion of the assembly of FIG. 10.

FIGS. 12-14 illustrate features of the delivery spout 210. Delivery spout 210 includes a fluid delivery tube 212 that extends through at least a portion of a spout housing 214. The base of the spout housing 214 includes a first end 216 that is configured to be attached to a faucet assembly. This first end 216 includes a tube positioning member 215 that is sized and shaped to receive a first end portion 211 of the fluid delivery tube 212.

For example, as best seen in FIG. 13, the tube positioning member 215 may have a first end 217 that has a tube receiving member 218. In this embodiment, the tube receiving member 218 is a generally U-shaped channel. This U-shaped tube receiving member 218 may be sized and shaped to receive and retain, as for example by a friction fit, a portion of the fluid delivery tube 212.

The tube positioning member 215 is configured to position the first end portion 211 in a manner that ensures proper alignment of the first end portion 211 with a fluid delivery connection in the center body 324 as shown in FIG. 14. Such alignment and connection arises when the delivery spout 210 is connected to escutcheon 230 as part of the faucet assembly 200.

Proper alignment of the first end portion 211 allows the delivery spout 210 to be quickly connected to the escutcheon 230 of the faucet assembly 200, while ensuring that the first end portion 211 is properly and sealingly connected to that center body 324 of the fluid housing 320. This avoids the need to disconnect and then reconnect the delivery spout 210 as a result of an improper connection of the fluid delivery tube 212. This reduces labor and assembly costs.

To assemble the fluid delivery assembly 300, the housing 320 is inserted into the mounting base 227 (FIG. 4), which has already been secured to the countertop 150. Each tube assembly 310 is then inserted into an end body 322, and the securing member 375 is then rotated by hand to cooperatively engage the tube threaded portion 370 and a housing threaded portion 380. This secures the tube assemblies 310 to the housing 320. Next, the first portions 340 of the tube assemblies 310 are connected to the hot and cold water source lines via the inlet valves 400, respectively. In this way, the entire fluid delivery assembly 300, or any portion of the fluid delivery assembly 300 (such as the tube assembly 310), may be easily removed and replaced as needed.

Figure 15:
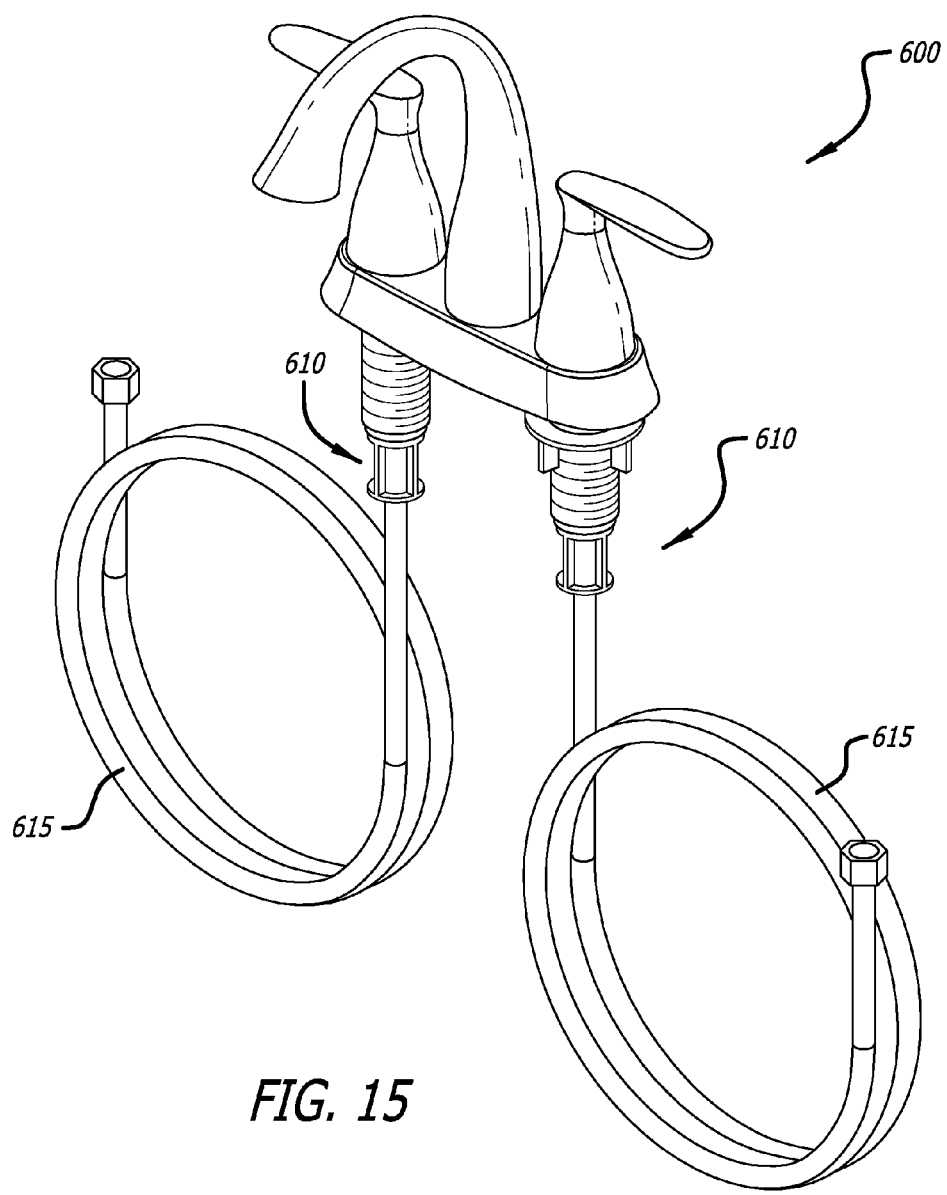
FIG. 15 a perspective view of another embodiment of the invention, connected to a faucet, to form an assembly.
Figure 16:
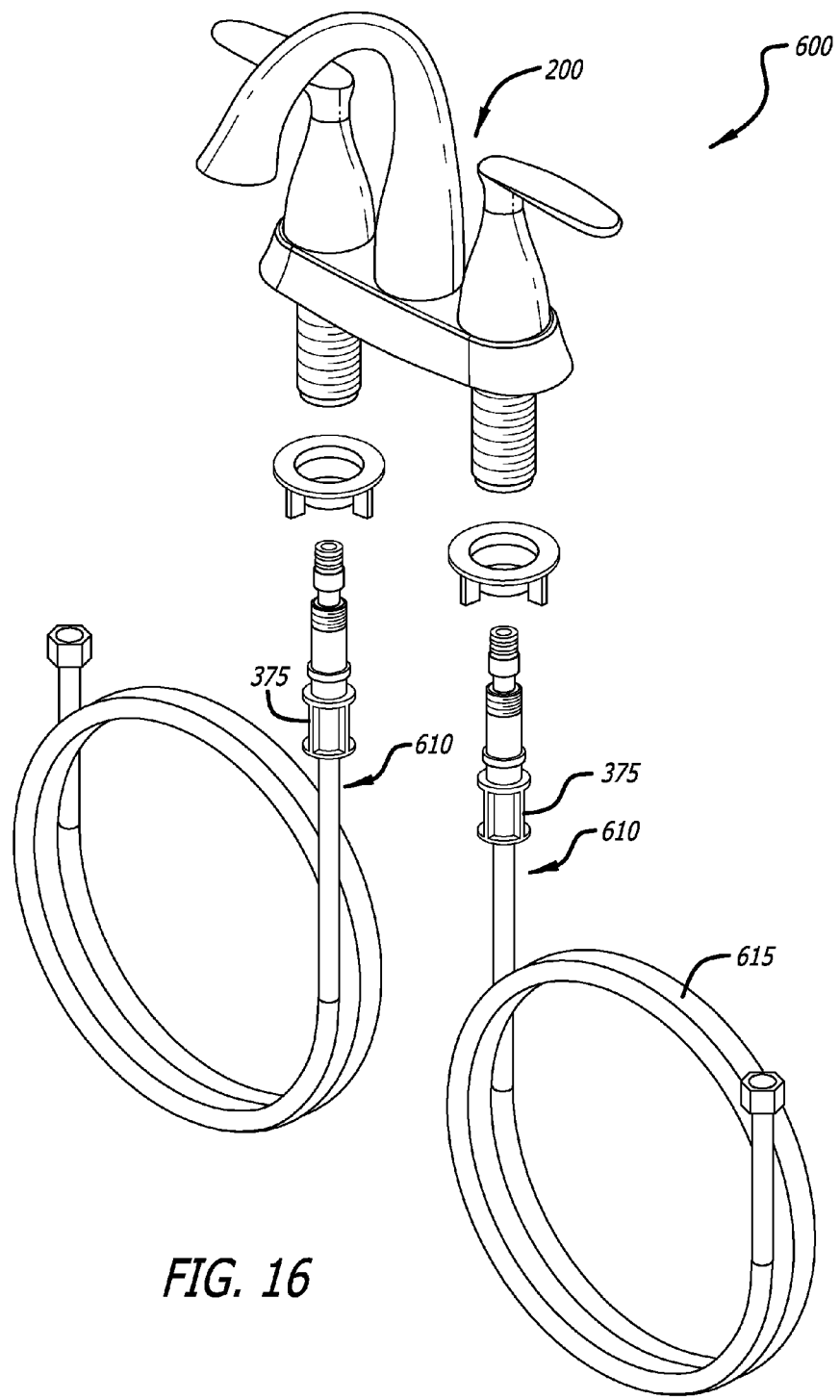
FIG. 16 is an exploded perspective view of the assembly of FIG. 15.

As can be seen in FIGS. 15 and 16, a faucet system 600 is similar to faucet system 100 with the exception of different tube assemblies 610 that have a longer tube 615. FIG. 16 illustrates how easily the tube assembly 610 may be installed, removed or replaced. For example, in a typical kitchen or lavatory sink configuration the connections of the tube assemblies 610 to the faucet assembly 200 are behind a sink bowl (not shown). This makes it difficult to use tools within the space behind the sink bowl. No tools are required in the space behind the sink bowl for faucet system 600 because the securing member 375 of each tube assembly 610 may be tightened or loosened by hand.

Figure 17:
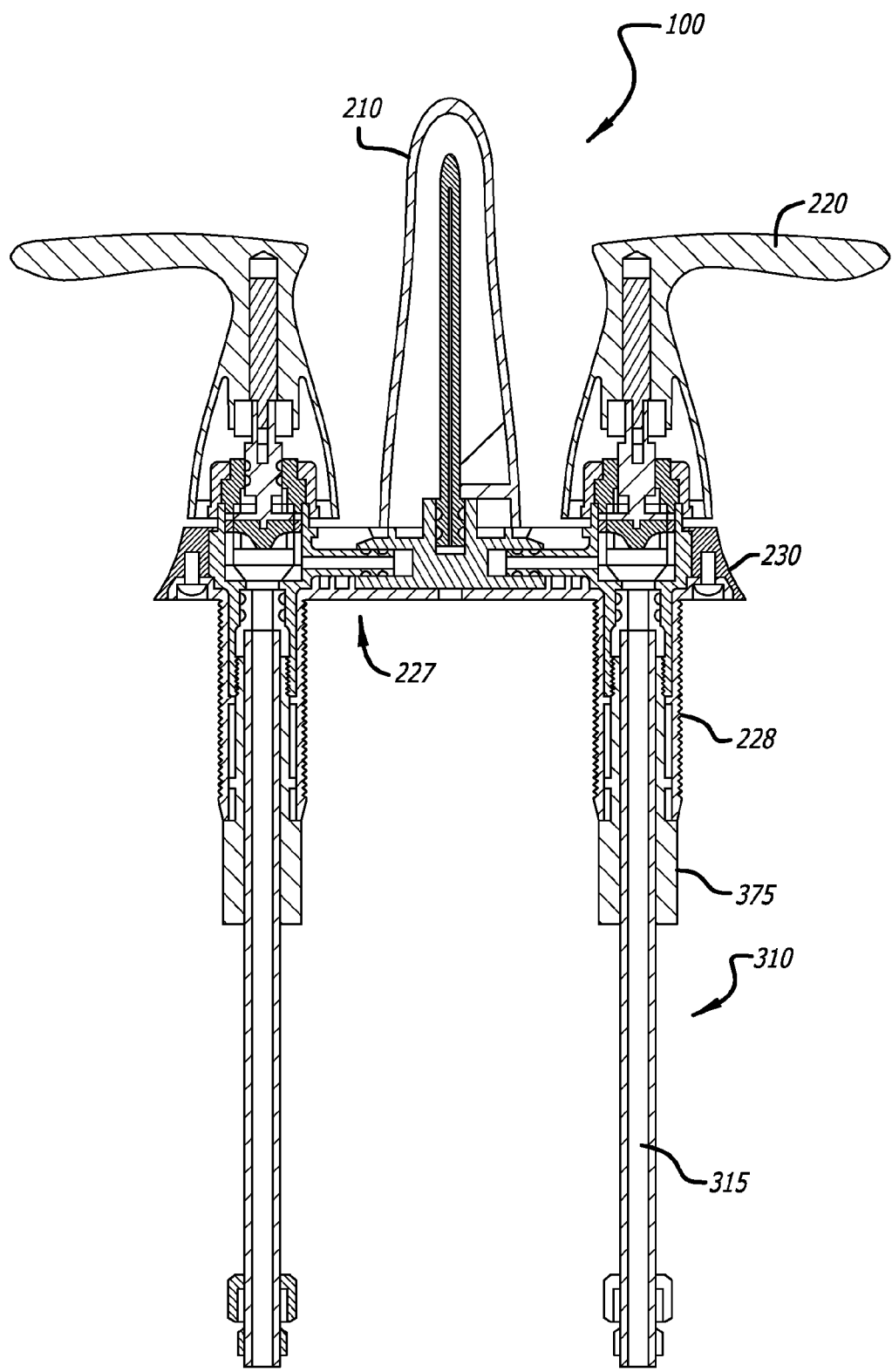
FIG. 17 is a front cross-sectional view of the faucet assembly of FIG. 1.
Figure 18:
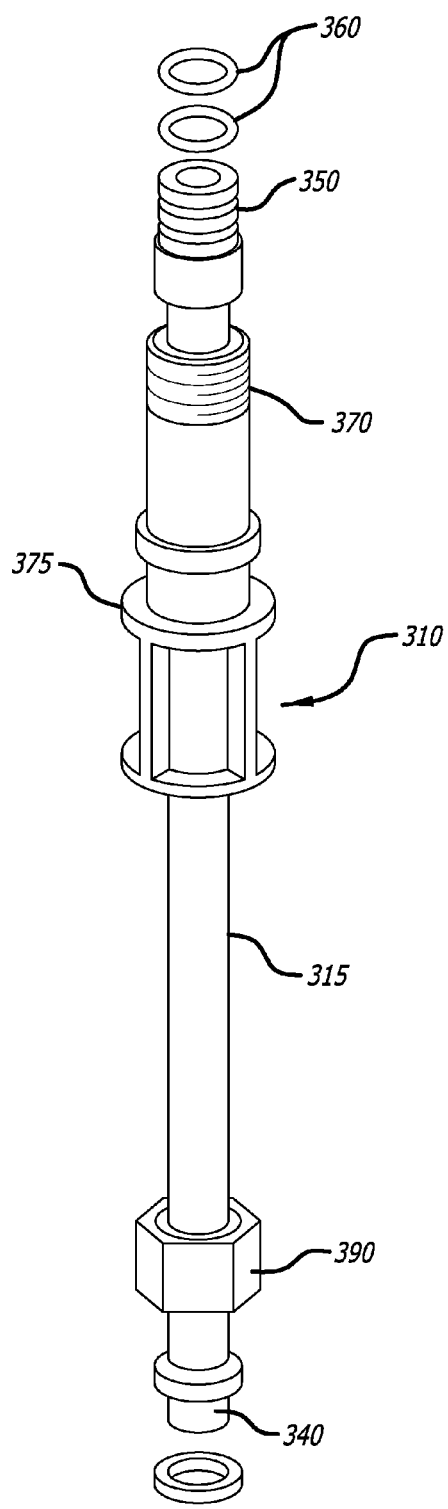
FIG. 18 is an exploded perspective view of an embodiment of a fluid delivery assembly.
Figure 19:
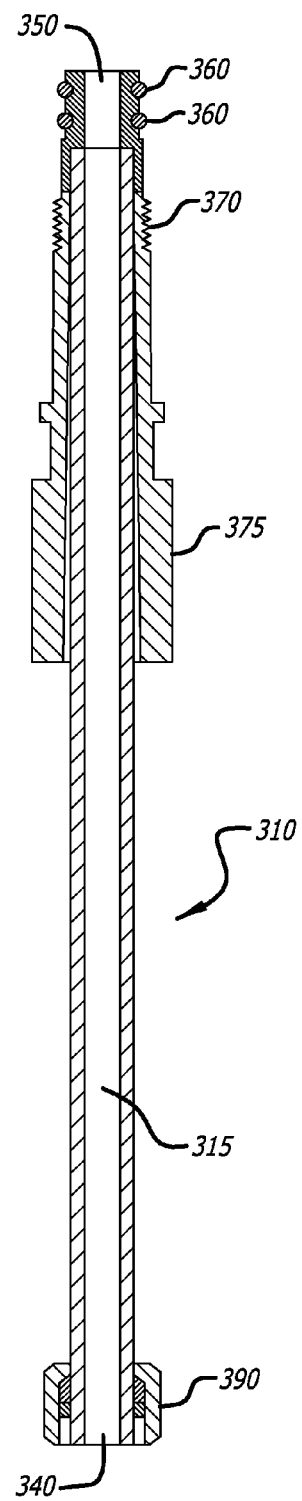
FIG. 19 is a front cross-sectional view of the fluid delivery assembly of FIG. 18.
Figure 20:
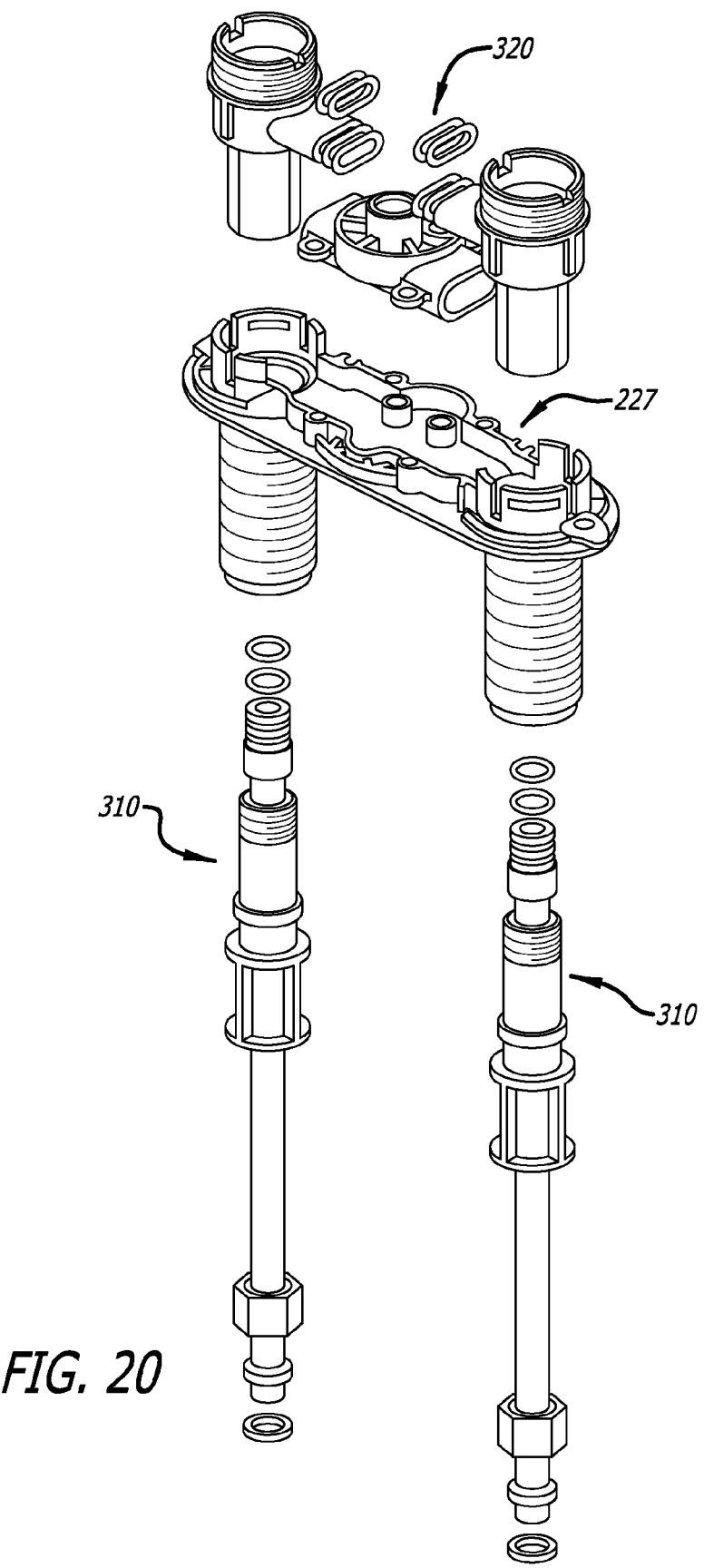
FIG. 20 is an exploded perspective view of a portion of the faucet assembly of FIG. 1.
Figure 21:
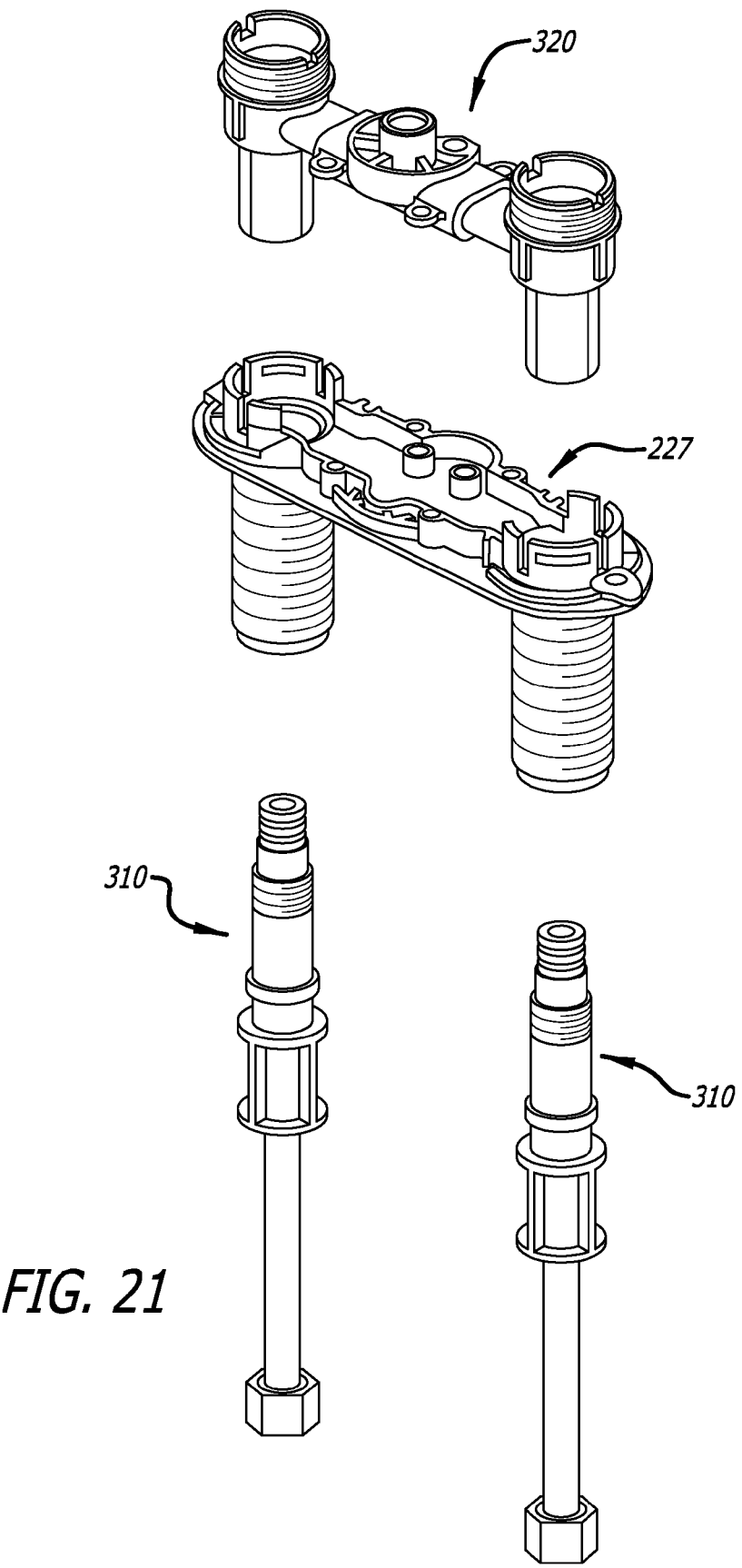
FIG. 21 is another exploded perspective view of a portion of the faucet assembly of FIG. 1.
Figure 22:
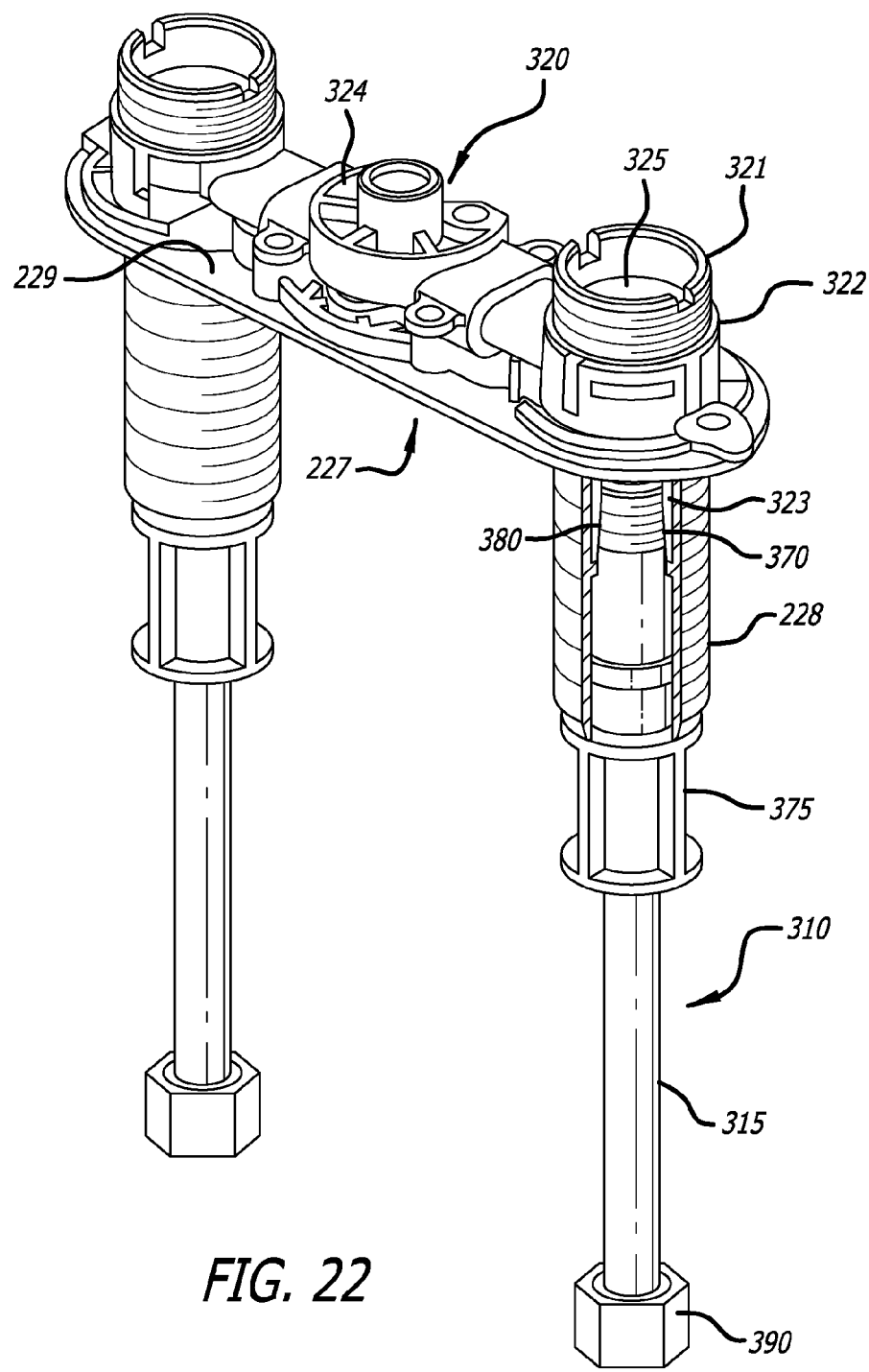
FIG. 22 is a partially cut-away perspective view of the assembly of FIG. 21.

FIG. 17 shows a cross-sectional of faucet system 100 after assembly of the fluid delivery assembly 300, which includes two tube assemblies 310. The tube assembly 310 is shown in more detail in FIGS. 18 and 19. FIGS. 20-22 show various stages of assembly of a housing 320, a mounting base 227 and two tube assemblies 310.

The foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents should be considered as falling within the scope of the invention.

The invention claimed is:

1. A fluid delivery assembly (300) for use with a fluid discharge fixture, the fluid delivery assembly (300) comprising:
    a housing (320) comprising at least one fluid inlet and at least one fluid outlet;
    at least one tube assembly (310) defining at least one fluid flow path, wherein a first portion (340) of the tube assembly (310) is configured to connect to a fluid source line, and wherein a second portion (350) of the tube assembly (310) is configured to connect to the housing (320); and
    a retaining assembly (330) to secure the tube assembly (310) and the housing (320), wherein a securing member (375) of the retaining assembly (330) is configured to be engaged or disengaged by hand without the use of tools, and wherein the housing (320), the tube assembly (310) and the securing member (375) are separate components that are not integrally formed together.

2. The fluid delivery assembly (300) of claim 1, further comprising a cartridge housing (325) configured to receive a fluid flow cartridge (500).

3. The fluid delivery assembly (300) of claim 1, wherein the tube assembly (310) is comprised of PERT plastic tubing and the housing (320) is comprised of plastic.

4. The fluid delivery assembly (300) of claim 3, wherein the retaining assembly (330) comprises:
- the securing member (375) that is a portion of the tube assembly (310), wherein the securing member (375) has a threaded portion (370), wherein the securing member (375) is slidably movable along the length of a portion of a tube (315) and rotationally movable about the circumference of the tube (315); and
- a mounting member that is a threaded portion (380) of the housing (320),
- wherein the threaded portion (370) of the securing member (375) is configured to cooperatively engage with the threaded portion (380) of the housing (320) to secure the tube assembly (310) to the housing (320).

5. The fluid delivery assembly (300) of claim 4, wherein the housing (320) comprises:
- a first end body (322);
- a second end body (322); and
- a center body (324).

6. The fluid delivery assembly (300) of claim 5, wherein the first end body (322) is configured to connect to a first tube assembly (310) and the second end body (322) is configured to connect to a second tube assembly (310).

7. A method of connecting a fluid delivery assembly (300) to a fluid discharge assembly, the method comprising:
- attaching a mounting base (227) to a countertop;
- inserting a housing (320) into the mounting base (227);
- inserting a tube assembly (310) into the housing (320);
- connecting a securing member (375) to the housing (320) by axially threading the securing member (375) onto a mounting member of the housing (320) by hand.

* * * * *